(12) United States Patent
Katabami

(10) Patent No.: US 6,373,474 B1
(45) Date of Patent: Apr. 16, 2002

(54) REAL CONTACT TYPE TOUCH PANEL APPARATUS

(75) Inventor: Koichiro Katabami, Ibaraki (JP)

(73) Assignee: Pentel Kabushiki Kaisha (JP)

( * ) Notice: Subject to any disclaimer, the term of this patent is extended or adjusted under 35 U.S.C. 154(b) by 0 days.

(21) Appl. No.: 09/426,531

(22) Filed: Oct. 26, 1999

(30) Foreign Application Priority Data

Oct. 27, 1998 (JP) ............................................. 10-321508

(51) Int. Cl.[7] ................................................. G09G 5/00
(52) U.S. Cl. ..................................... 345/173; 178/18.01
(58) Field of Search .................................. 345/173, 174, 345/175, 177, 178, 179; 178/18.01, 18.03, 18.05, 18.06, 18.07, 19.01, 19.03, 19.06, 19.07, 20.01

(56) References Cited

U.S. PATENT DOCUMENTS 5,854,881 A  * 12/1998 Yoshida et al. .............. 345/174
6,075,520 A  *  6/2000 Inoue et al. ................. 345/173
6,124,848 A  *  9/2000 Ballare et al. ............... 345/179

* cited by examiner

Primary Examiner—Regina Liang
(74) Attorney, Agent, or Firm—Adams & Wilks

(57) ABSTRACT

A touch panel apparatus has a sensor panel using a tin oxide resistive film that avoids the palm effect and has an improved noise margin and S/N ratio. A finger or conductor is brought into direct contact with the touch panel and injected with an AC signal of 200 kHz or more, a signal current is detected, and the current is converted into a voltage by a transistor connected to an LC resonance circuit. The touch panel is contained in a voltage-floating system insulated from a non-floating system through a capacitor of 5000 pF or less and has an A/D converter in which a step-shaped triangular wave is superimposed on a measured voltage so that output at each step of an analog/digital converter is added.

17 Claims, 5 Drawing Sheets

REAL CONTACT TYPE TOUCH PANEL APPARATUS

FIELD OF THE INVENTION

The present invention relates generally to a touch panel apparatus for detecting a touch condition of a finger of an operator on a touch panel and, more particularly, to a real contact type touch panel apparatus in which a finger or a conductor ohmically-contacts a conductive surface of a touch panel.

BACKGROUND OF THE INVENTION

A touch panel apparatus which utilizes a resistive layer can be generally classified into three groups by a panel structure thereof. The panel structure comprises two resistive layers in conductive relationship with each other, or an array to be partially shaded by a finger. Furthermore, Japanese Patent Nos. 1536723 (William Pepper, Jr., Feb. 22, 1980) and 2603986 (Asano et al. Mar. 11, 1988) disclose touch panel apparatuses having a simple structure of a panel, which basically comprises a single resistive layer.

Japanese Patent Nos. 1536723 and 2603986, disclose touch panel apparatuses directed to both a capacitive coupling touch panel apparatus and a real contact touch apparatus. However, the two patents do not disclose three points which will be described hereinafter. That is, according to the two patents, only the capacitive coupling touch panel apparatus could be easily practiced.

The first point is the problem that noise is generated by a conductive human body. The human body has noise conductivity in a wide range of frequencies. For example, when a human is immediately in front of a CRT display apparatus and a personal computer, he or she receives voltage noise at a much higher level than the signal level generally used in a touch panel. In particular, a 50 to 60 Hz component from a commercial power often exceeding 20 V. The electrostatic capacity coupling type touch panel apparatus has the feature that low frequency noise is automatically eliminated through a coupling capacity of approximately 10 pF. On the other hand, the real contact type touch panel has noise mixed into the original signal, with respect to all frequency components.

The second point is the problem of insulating a finger at a contact location. Particularly, since a power source of a touch panel apparatus is applied from a commercial power of 100 to 200 V, few or large amount of power component (common mode component) is flown into the apparatus through power transfer, electromagnetic coupling, or a power source noise filter (particularly via a capacitor). Therefore, the real contact type touch panel apparatus has a powered part of a circuit on which a finger really contacts. In the electrostatic capacity coupling apparatus, the problem of insulation is not caused, since an insulating layer is disposed on the panel surface.

The third point is the problem that the surface resistive film has no durability. Since the resistive film of the real contact type touch panel apparatus is directly rubbed by a finger, the resistive film must be carefully chosen from durable materials which are selected for the resistance membrane.

Moreover, there is also a problem in the electrostatic capacity coupling type touch panel apparatus, as illustrated in FIG. 5. Referring to FIG. 5, an electrostatic capacity coupling type touch panel apparatus having a surface resistor 54 with uniformity, the surface being coated with an insulation layer, and a low resistance electrode 55 surrounding the surface resistor 54, is illustrated. The four corners A, B, C, and D form a connecting terminal for connecting an electric wire, respectively. The touch panel is touched by a finger 7 of an operator in FIG. 5.

The operator tries to touch and indicate a point P1 on the touch panel with his finger 7. However, coupling capacity also will be generated between other fingers besides the finger 7, and points P2 and P3 on the touch panel, respectively. In addition, coupling capacity will be generated between his palm and a point P4. Accurately, these additional coupling capacities distribute about the points P2, P3, and P4 on the touch panel. The touch panel apparatus will identify a point Pm determined by calculating a mean point between P1, P2, P3, and P4 on the touch panel. Accordingly, a final input point for the touch panel apparatus will be at a location which is shifted in the direction of the user's palm. The shift phenomenon of the point Pi on the touch panel will be hereinafter called "a palm effect". The palm effect can influence all types of electrostatic capacity coupling type touch panels with use of a uniform resistive film, including the touch panel apparatus with the construction illustrated in FIG. 5.

The subject of the present invention is directed to categories of touch panel apparatuses which utilize resistive film comprising a single layer. In addition, the subject of the present invention includes uncovering uncertain reasons of the grounding effect of human body.

SUMMARY OF THE INVENTION

In order to avoid the palm effect, the present invention provides a touch panel apparatus having a resistive film on a touch panel to be directly contacted by a finger.

Secondly, in order to avoid the harmful influence of noise, the present invention provides a touch panel apparatus comprising a signal processing unit having an input circuit provided with a current/voltage conversion circuit. The current/voltage conversion circuit includes a transistor having a grounded base or gate, an emitter into which an AC signal is input, and a collector or drain electrically connected to a resonance circuit comprising a coil and a capacitor. The touch panel apparatus further comprises signal level measuring means for improving a S/N ratio of a detection signal and effecting a high resolution A/D conversion. The signal level measuring means comprises A/D converting means, the A/D converting means including means for superimposing a step-shaped triangular wave having an amplitude of 2 or more LSB of an analog/digital converter, on an output voltage level of AC/DC (AM detection), and means for adding the output at each step of the step-shaped triangular wave from the analog/digital converter.

Thirdly, in order to assure an insulation of a panel in the touch panel apparatus, a voltage-floating system (a circuit block) is provided in the touch panel apparatus. Particularly, a panel unit and the signal processing unit in the touch panel apparatus are also arranged in the voltage-floating system. The voltage-floating system enables reception and transmission of analog or digital electric information from and to a non-floating system through an isolator. The voltage-floating system has a reference potential circuit connected to a ground circuit of the non-floating system through a series circuit consisting of an AC signal generator and an AC signal coupling capacitor of 5000 pF or less.

Fourthly, in consideration of the durability of a resistive film on a panel, the resistive film comprises tin oxide.

Fifthly, in order to obtain the grounding effect of human body unconditionally, an AC signal current flown between a finger and a panel is set at frequency of 200 kHz or more.

Operations

In accordance with a first aspect of the present invention, contact resistance between a portion of contact of a finger which touches a panel and a location of a panel touched by the finger is utilized. The contact resistance is set to a much smaller value than the magnitude of capacitive coupling impedances of a palm and the like so that approximately 100% of the AC current passes through the location on the panel touched by the finger. Accordingly, when the touch panel apparatus senses the location on the panel touched by the finger, the input location is not shifted by influence of the palm effect.

In a second aspect of the invention, some key points are exemplified. A first point is that since a noise source generally has a very high impedance, even though the voltage is high, a large amount of current is not drawn. This is one of the reasons that signals from a panel are detected by means of current detection in the apparatus. A second point is that even though either a bipolar transistor or a field effect transistor is used, a sufficient linearity to be required is produced. Because 99.5% (the bipolar transistor) or 99.95% (field effect transistor) of an emitter or source input current is sent to a collector or drain, the linearity of a circuit can be maintained until instantaneous current at a collector or drain has reached approximately zero. Since the collector or drain undergoes a load applied from a resonance circuit which comprises a coil and a capacitor, even though very large efficiency of current/voltage conversion at a signal frequency is obtained, a voltage on the collector or drain does not undergo a voltage change and is not saturated. Accordingly, the touch panel apparatus has a considerably large noise-margin. In addition, samples are picked up n times, n being an integer, and the picked-up samples are averaged. Consequently, a S/N ratio is improved by √n times. In the case of a panel using a resistive surface, since a location touched by a finger is calculated in accordance with a ratio of signal levels detected from some points on the panel, it is not required to average the detected signals. According to the present invention, each of the outputs of an analog/digital converter are only addedn times so that the S/N ratio is automatically improved. Moreover, at this time, if a step-shaped triangular wave is superimposed on the measured analog voltage, although A/D linearity is not increased, equivalently improved resolution of A/D conversion is also provided through the superimposed wave.

A third aspect of the invention is based on a capacitor having an impedance depending on frequency. The capacitor has sufficiently low impedance at AC signal frequencies for providing an operation of a coupling capacitor, while it has a high impedance at a power source frequency range of 50 to 60 Hz, which is a value regarded as an insulating material.

In a fourth aspect, a tin oxide-based ceramic film provides mechanical or chemical features of excellent durability similarly to glass, and more effective lubricity than glass.

In a fifth aspect of the invention, a human body having a resistance of a few to approximately 10 kΩ as a conductor provides an antenna to cause electromagnetic wave to be radiated, when the human body (conductor) is excited by AC voltage. In general, the radiant impedance as the antenna is reduced, if higher exciting-frequency is supplied from the touch panel apparatus. The voltage oscillation of the human body (conductor) is loaded with the radiant impedance. Therefore, even though the human body is sitting on an insulated chair or standing on an insulated stand, the voltage-restraining effect (the ground effect) on the human body provides preferable performance for oscillation frequency (the AC signal frequency) of 200 or more kHz.

The present invention resides in a real (or direct) contact type touch panel system for inputting a location (coordinates) on a panel that a point on the panel is indicated with a finger of an operator or a conductor. The present invention also resides in a real contact type touch panel apparatus for inputting a position indicating a section on a panel with a finger of an operator or a conductor as used in a touch keyboard, and a real contact type touch panel apparatus for detecting only a contact of a finger or a conductor, or a touch panel apparatus for providing all of the functions described above.

DESCRIPTION OF PREFFERED EMBODIMENT

Figure 1:
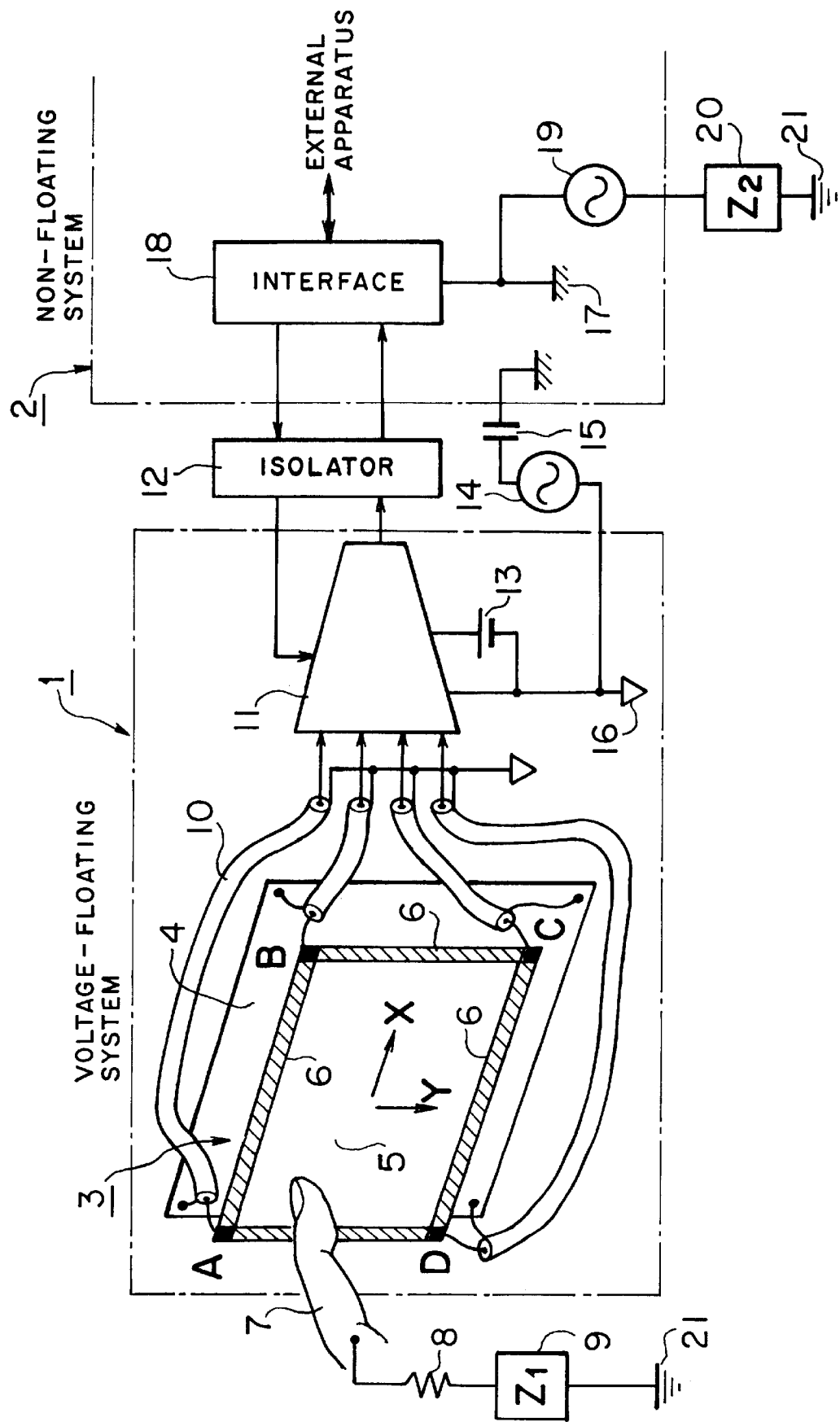
FIG. 1 is a schematic view showing a sensor panel having a uniform surface resistor, which is used with a real contact type touch panel apparatus for detecting a location touched by a finger or a conductor.

Detailed descriptions of the present invention will be given hereinafter, referring with the accompanying drawings. FIG. 1 is a drawing of depicting a real contact type touch panel apparatus for detecting a location (X, Y coordinates) touched on a sensor panel 3 by a finger 7 or a conductive pen, not shown, of an operator. The sensor panel 3 has a surface resistor 5, and ambient electrode 6 surrounding the surface resistor 5. Electrode 6 has a low resistance. The four corners A, B, C, and D are connecting terminals for connecting electric wiring (electric shield wiring) 10, respectively. The surface resistor 5 has uniformity and no insulating layer coated thereon, thereby a real electrical contact (ohmic contact) is made between the surface resistor 5 and the finger 7 or conductive pen of the operator. Therefore, the present apparatus is not directed to an electrostatic capacity coupling type touch panel apparatus. The touch panel apparatus is provided with a shield plate 4, as shown in FIG. 1. The shield plate 4 may not be necessarily disposed. However, if the sensor panel 3 is utilized as being attached on a display surface of a CRT display or a liquid crystal display and the like, the sensor panel 4 is available for removing unnecessary electromagnetic interference. The details of the sensor panel 3 will be discussed later.

The touch panel apparatus according to the present invention has a voltage-floating system 1 and a non-floating system 2. The voltage-floating system 1 includes the sensor panel 3 disposed therein, and has an insulation at frequency of 50 to 60 Hz with respect to the non-voltage-floating system 2. Thus, even though the conductive surface of the sensor panel 3 is directly touched by the finger 7 of the operator, electric shock does not transmit from the conductive surface to the operator. (The detailed descriptions will be given later.)

The sensor panel 3 is connected to input terminals of signal processing unit 11 via the four corners A, B, C, and D of the ambient electrode 6 thereof. Each of the connecting terminals of the signal processing unit 11 has low impedance with respect to a potential circuit 16 in the voltage-floating system reference. Therefore, the sensor panel 3 as a whole (including the shield plate 4) follows the reference potential 16 of the voltage-floating system. The signal processing unit 11 is fed power 13, which is supplied from a battery or from an insulated power source in the non-floating system 2.

The voltage-floating system 1 transmits and receives analog or digital electric information from and to the non-floating system 2 through an isolator 12. Non-floating system 2 has an interface 18 capable of providing a part of processing operations of signals.

More particularly, the invention will be described in relationship to an insulation of the sensor panel 3 with respect to a commercial electrical power (AC 100 to 200 V, 50 to 60 Hz). According to the invention, the voltage-floating system 1 is insulated from the non-floating system 2 to impart insulation to the sensor panel 3. A system including the touch panel apparatus as a whole has a non-floating system ground circuit 17 in the non-floating system 2. It will be observed in FIG. 1 that the reference numeral 19 indicates an equivalent combined voltage source. This is some power component from an alternating power that is passed or induced into the non-floating system ground circuit 17 from a commercial electrical power through each of power transformers, not shown, electromagnetic coupling, or a power noise filter (particularly, those using a capacitor). The reference numeral 20 (Z2) indicates ground impedance with respect to the non-floating system ground circuit 17. As described above, the non-floating system ground circuit 17 exhibits a potential containing some power frequency component, observing from the ground 21.

In the touch panel apparatus, the non-floating system ground circuit 17 is connected to the reference potential circuit 16 of the voltage-floating system 1 through an AC signal coupling capacitor 15. The insulation between the voltage-floating system 1 and the non-floating system 2 is provided by only the coupling capacitor 15. The reference numeral 14 indicates an AC signal generator for detecting a touch location (X-Y coordinate points) of the finger 7 of the operator. In this embodiment, the signal generator 14 generates signals at 460 kHz. In this case, the impedance of the signal generator 14 may be regarded as that of approximately zero with respect to frequencies in the range of 50 to 60 Hz.

Generally speaking, when power of AC 100 V is fed from the commercial electrical power, the impedance of the insulator is desired to be set to over 1 MΩ for safety of the human body. The impedance of 1 MΩ is caused at frequency of 60 Hz, when a capacitor has a capacity of 2500 pF. Since most of the noise filter for power divides a voltage of power into a half voltage so as to cause the divided voltage to be applied to the ground circuit 17, the insulating impedance of 500 kΩ will be created. In this case, the capacity of the capacitor 15 may be 5000 pF. In this embodiment, the AC coupling capacitor 15 (insulating capacitor with respect to the commercial electrical power) is set to 2200 pF.

A description now will be made with respect to a necessary supply of power from an electrical power external to the commercial electrical power. When an electrical power source such as a battery or a dedicated generator, not shown, is utilized separately from the earth 21, all circuits of the touch panel apparatus as a whole are interrupted from the earth 21 with respect to the power. Thus, no current is applied to the finger 7 in relationship with the electrical power. Therefore, the non-floating ground circuit 17 may be directly connected to the reference potential circuit 16 of the voltage-floating system without the AC signal coupling capacitor 15 (insulating capacitor). In this case, much of the voltage-floating system 1 is floated by the AC signal generator 14, while the AC signal generator 14 creates a small voltage amplitude at a voltage level of 0.4 V rms. Therefore, it is easy to directly connect the signal processing unit 11 of the voltage-floating system 1 to an interface 18 of the non-floating system 2. The electrical power 13 of the signal processing unit 11 also needs not to be inevitably isolated from the non-floating system 2. Supply of power from a commercial electric power source will be understood in accordance with the above, when the power is fed through an insulating transformer. In this case, the apparatus also operates independently of the earth 21 in relationship with the electrical power.

Next, the operation for detecting a location (X-Y coordinate points) touched on the sensor panel by the finger 7 of the operator will be described. The AC signal generator 14 generates a sine wave of 0.4 V rms at 460 kHz. The AC signal coupling capacitor 15 has a capacity of 2200 pF, and an impedance value of 160Ω with respect to 460 kHz. As described above, the sensor panel 3 follows the reference circuit 16 of the voltage-floating system 1 with respect to the potential. The finger 7 really touches on the uniform surface resistor 5 of the sensor panel 3. Therefore, it will be understood that the contact resistance between the finger 7 and the uniform surface resistor 5 is not created. However, the human body itself is a conductor having resistance of few to about 10 kΩ. Referring to FIG. 1, an equivalent resistance can be found, as indicated at the numeral 8.

The human body is grounded to the earth 21 through an impedance 9 (Z1), which is created in combination of the grounded capacity known in the prior art and the grounded effect, which is one of key points of the present invention (the detail will be described later). The non-floating system has a grounded impedance 20 (Z2) grounded to the earth 21 through a supply line of the commercial electrical power. The grounded impedance 20 (Z2) normally has a smaller impedance value than the impedance 9 (Z1) created by the grounded effect of the human body. The equivalent voltage coupling source 19 from the alternating power has an impedance which is that of approximately zero with respect to the AC signal frequency. The coupling source 19 is also includes a combination with some amount of noise component at a frequency of over 60 Hz, which is caused by the alternating power.

The AC signal for detection of coordinates is electrically looped through an AC signal generator 14; the reference potential circuit 16 of the voltage-floating system; a low input impedance circuit of the signal processing unit 11; electric shield wires 10; the ambient electrode with low resistance 6; the uniform surface resistor 5; the finger 7; the equivalent resistance 8, the grounded effect impedance 9 (Z1); the earth 21; the grounded impedance for the non-floating system 20 (Z2); the equivalent voltage coupling source 19; the ground circuit 17 of the non-floating system 2; an AC signal coupling capacitor 15; and an AC signal generator for generating an original AC signal.

According to the electrical loop described above, the equivalent resistance 8 and the grounded effect impedance 9 (Z1) of the human body, and the ground impedance 20 (Z2) depend on the construction of the non-floating system having impedance of over 1 kΩ. The grounded effect impedance 9 (Z1) of the three elements described above has a variable fluctuation which is greatly dependent on the flow of the AC signal current passed through the sensor panel 3. In the illustrated embodiment, when the AC signal current is received by the finger 7, the current flow is of only about 80 µA rms maximum.

The larger flow of the AC signal current flowed by the finger 7 is generated at nearer point in connecting points (A, B, C, and D) to the real contact location touched on the panel 3 by the finger 7. Thereby, the real contact location (X-Y coordinate points) touched on the panel 3 by the finger 7 is calculated in accordance with a value of the AC signal current passed through each of four terminals.

Description now will be made with respect to the ground impedance effect 9 (Z1) of the human body. The ground effect impedance was found by measurement of the grounded capacity of the human body. The measurement was made with a man who stood on the earth wearing a pair of shoes or who was in immediate front of a conductive desk. The measured capacity was 10 or more pF (by use of 10 kHz). However, when the man stood on an insulating stand at height of 20 cm from the earth, the measured capacity was below 1 pF (at frequency of 10 kHz). On the other hand, when the measurement was made with the ground impedance value at 460 kHz, the impedance value was found to be about 7 kΩ. It is generally understood that if the ground capacity is 1 pF at 460 kHz, the calculated impedance will be at 350 kΩ. This can be said that the grounded effect is provided for any cause except the grounded capacity. Each experiment revealed that the cause was oscillatory voltage restraining effect (ground effect) produced by a load of the radiant impedance, which is electromagnetic wave radiated from the human body operating as an antenna.

With respect to frequency of 460 kHz, when the man stood on an insulating stand at a height of 1 m from the ground, the ground impedance did not have large difference relative to a value at the ground impedance described above. Furthermore, when a grown-up man was in squatting position on a stand or when an elementary school child in the lower grade stood on the stand, the ground impedance at frequency of 460 kHz was approximately 15 kΩ. On the other hand, when the ground impedance at frequency of 200 kHz was measured, in any case of the measured objectives described above, the ground effect was reduced to ½ to ½.5. (The ground impedance value of the human body was increased.)

To summarize the above descriptions, when the conductor has very small size like the human body relative to the wavelength of the electromagnetic wave radiated from the conductor, the radiant impedance generated from the electromagnetic wave is in substantially inverse proportion to the product of the electrical oscillation frequency by the size (particularly to the length or height) of the conductor (the human body). Accordingly, if the electrical oscillation (excited) frequency is at 200 kHz to 500 kHz, then the wavelength of the electromagnetic wave will be 1.5 km to 600 m. It will be understood that when the conductor has the same size as the human body, the radiant impedance having the value described above can be obtained. When the AC signal was generated at frequency of below 200 kHz, it was very difficult to unconditionally detect the coordinate points, because of considerably variable flow of the looped AC signal current depicted in FIG. 1. In this embodiment, when the AC signal generator 14 is of 460 kHz frequency, the AC signal current flowing into the sensor panel 3 has totally a fluctuating width by about 3 times.

As described above, it will be clear that all types of touch panel apparatuses in which an AC signal passes through a sensor panel by a real contact, utilizing the ground effect of a human body or a conductor, is dependent on the capability of the ground effect. Therefore, it can be said that the real contact type touch panel apparatus provides highly reliable detection of the coordinate points at the AC signal frequency of 200 kHz or more. Furthermore, when pulse signals are utilized in a touch panel apparatus, if measurable frequency components of 200 kHz or more is contained in the pulse signals, the touch panel apparatus also provides the same merit as the one described above. In addition, if the touch panel apparatus is utilized in handy apparatuses or devices having a battery as electrical power, it was also found that the increased ground effect in the ground circuit of the non-floating system was provided at an AC signal frequency of 200 or more kHz.

Figure 2:
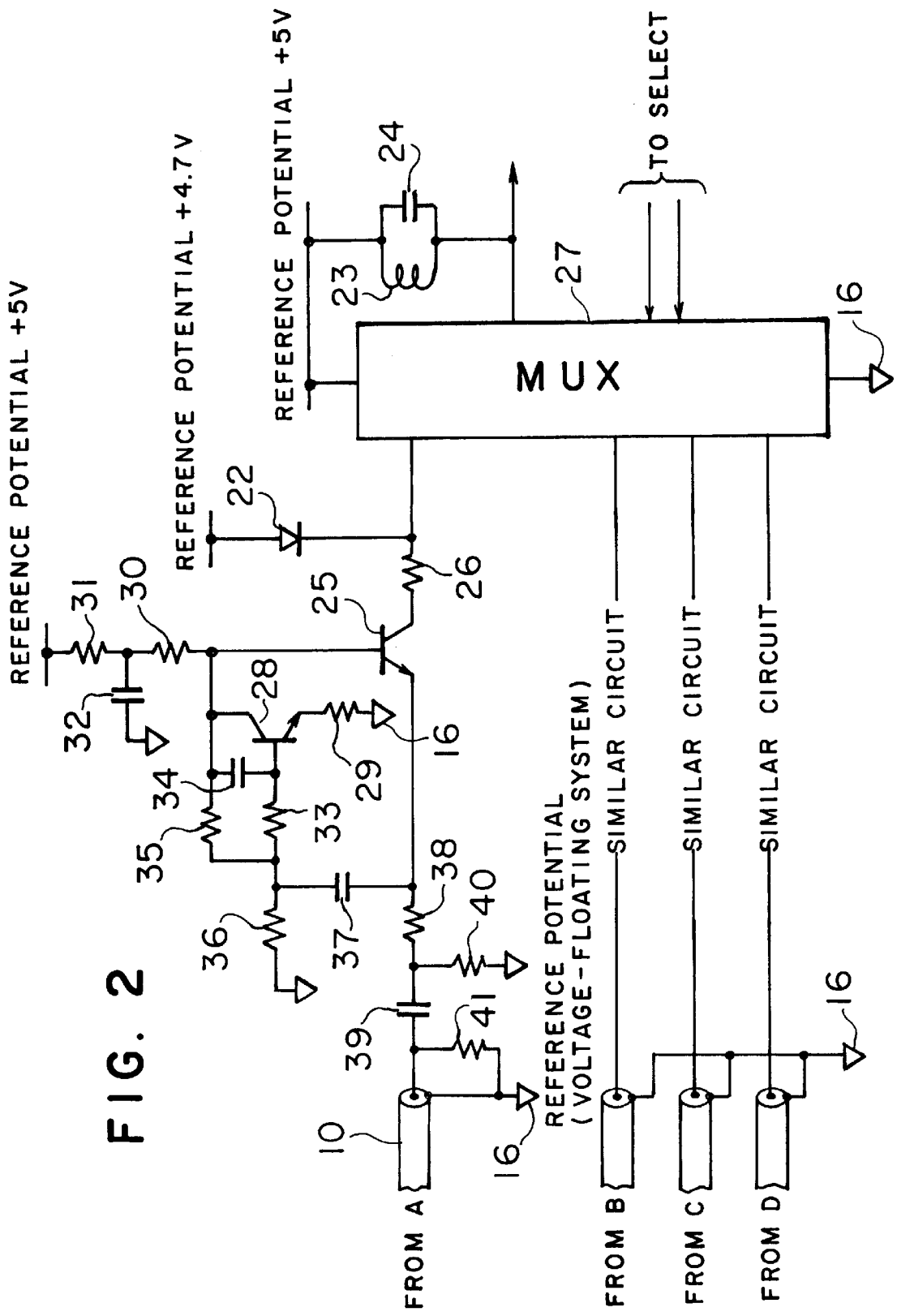
FIG. 2 is a circuit diagram showing an example of an input circuit (current/voltage conversion circuit with low input impedance).

Next, a current/voltage conversion circuit used in an input circuit of the signal processing unit 11 will be described. FIG. 2 shows an example of an AC current/AC voltage conversion circuit having lower impedance with respect to input. The basic construction of the AC current/AC voltage conversion circuit comprises a transistor 25, and an LC resonance circuit 23 and 24. The transistor 25 has a base grounded in an alternating position through resistor 30, and sends about 99.5% of AC signal input current from an emitter to a collector. The collector of the transistor 25 itself has an output impedance with a large value. Since the Q value of the LC resonance circuit 23 and 24 is only slightly lowered by selection of an analog multiplexer 27, the circuit produces high impedance at AC signal frequency. Therefore, the transistor 25 provides transfer impedance at high value, there by the AC current/AC voltage conversion circuit provides higher efficiency of AC current/AC voltage conversion for the frequency component of the AC signal generator 14. The AC current/AC voltage conversion circuit has the high efficiency of AC current/AC voltage conversion, while it has extremely large dynamic range containing noise, and provides considerably increased noise margin. This is also one of the characteristics of the present invention as described hereinafter.

In almost every case, the transistor 25 sends 99.5% (approximately fixed value) of the instanteneous current from the emitter thereof to the collector thereof irrespective of the current value, until the current value has approached Zero. Therefore, since the transistor 25 creates sufficient and satisfactory linearity, the linearity of the AC current/AC voltage conversion circuit is maintained. In addition, voltage at the collector is not varied with the noise component of the current having different frequency than that of AC signal. Thus, the circuit on the side of the collector is not saturated. Because the circuit does not lose linearity thereof, before the instanteneous current at the emitter approaches substantially zero. Thereby, according to the embodiment, the AC signal current is only about 80 µA rms maximum. Even though the AC signal current combines with noise, the combined AC signal current is not deformed from the frequency component of the signal before the DC bias current of about 1.3 mA approaches zero. Therefore, when the AC signal experiences invasion from noise of +21 db in a different frequency than the signal frequency, shifting of the detected location is not caused. Thus, even if the AC current/AC voltage conversion circuit increases the efficiency in the current/voltage conversion, the circuit is not saturated. Thereby, the circuit produces an extremely large dynamic range.

The allowable noise level can be further increased, if the DC bias current at the emitter is more greatly set. Even though the human body is exerted by noise component generated from the 50 to 60 Hz commercial electrical power, the noise current of the low frequency is eliminated from the AC signal frequency by an AC signal coupling capacitor 15 (insulation capacitor shown in FIG. 1). The AC current/AC voltage conversion circuit according to the present invention is very useful for the touch panel which is susceptible to large mixed noise. Therefore, when the AC current/AC voltage conversion circuit is used with a television, a personal computer, a CRT monitor, a liquid crystal display, and the like, the circuit permits stable operation of the latter. For the conventional apparatus for detecting a touch location of a finger, an operational amplifier was susceptible to the saturation caused by the noise, and the allowable noise level was only 0 dB.

The parallel resonance circuit 23 and 24 is connected to a circuit of four input circuits provided in the analog mutiplexer 27 so as to allow AC signal currents at points A, B, C, and D to be measured by time sharing. A diode 22 operates even the input circuit of the signal processing unit that was not selected by the analog multiplexer 27, then the diode 22 substitutes for a load having a cLamping operation for constantly sustaining the input impedance of the input circuit at uniform value. Although the analog multiplexer 27 has stray capacity therein, since it is provided as a part of the resonance capacitor 24, loss of the signal is not caused. Furthermore, the signal used with the touch panel apparatus is processed through a single-ended circuit with respect to the reference electrical potential circuit 16 of the voltage-floating system 1. Therefore, the signal component doses not suffer from all the stray capacity generated in the input circuit because no suprious component affecting the signal component is produced. This is also one of characteristics of the touch panel apparatus according to the present invention.

The input impedance at the emitter of the transistor 25 is 15 Ω or more. However, the construction of the sensor panel 3 according to the embodiment is desired to set to an even lower input impedance. Therefore, the input circuit of the signal processing unit is additionally provided with an inverting amplifier circuit operated by a transistor 28. When variation in voltage at the emitter of the current/voltage conversion transistor 25 is caused, the varied part of the voltage is applied to a base of the transistor 28 through an AC coupling capacitor 37. The varied part of voltage is inversely amplified in phase by a common-emitter type transistor 28, and applied to the base of the transistor 25 to cause DC voltage at the base of the transistor 25 to be modulated. The modulated DC voltage permits reduction in the variation in voltage at the emitter of the transistor 25. Consequently, the input impedance at the emitter of the transistor 25 is lowered. With a frequency of 460 kHz, the input impedance obtained from the embodiment was 2.5±0.5 Ω. Fixed numeral values set for each of the other circuits are ascertainable by reference to a numeral description.

It should be observed that the emitter of the transistor 25 is linked to a large stray capacity in the range of 500 to 1000 pF. Therefore, in order to provide stable operation for the input circuit of the AC current/AC voltage conversion circuit, it is required to compensate for phase through a resistor 33 and a capacitor 34. Even if the phase compensation is provided, operation of an open loop gain is not substantially reduced at 460 kHz. The AC current/AC voltage conversion circuit provides absolute stable operation, even if an input stray capacity of 1000 pF is created. If the operational amplifier is used instead of the above circuit, since the stray capacity is combined into a summing point, the input circuit of the signal processing unit can not easily provide stable operation enabling sustained input impedance of 2.5 Ω.

If impedance of the input circuit shown in FIG. 2 is not sufficiently reduced relative to resistance value between both corners of the low resistive ambient electrode 6 disposed on the sensor panel 3, the distribution ratio of the currents at A, B, C, and D points decreases. Thereby, an error in a calculated location is caused. In addition, the low input impedance can also prevent loss of signals that is caused by a large capacity of a shield electrical line 10, a shield plate and the others. The sensor panel 3 in the embodiment is provided with the uniform surface resistor 5 of 1 kΩ/□ (square), and the low resistance ambient electrode 6 of the sensor panel 3 has a resistance of 120 Ω, which is set between corners thereof, respectively. Thus, the curved feature (or straight linearity) of the calculated location approaches an approximately straight line for showing the actual input location without compensation. It is ascertained that the input circuit shown in FIG. 2 provides each of parameters approximately to ideal value, including the input impedance.

Although described above in relation to a bipolar transistor, the input circuit shown in FIG. 2 also provides the same characteristics with use of a field effect transistor. Furthermore, the AC coupling capacitor 39 as the input may be replaced with a coupled coil. According to the conventional apparatus, when a touch location of a finger on a panel was detected by the AC signal current passing from the finger to a human body, stray capacity was produced even at a shield plate, a shield electrical line, and a casing of the apparatus and the like so that the AC signal current flowed to the stray capacity. Therefore, since the AC signal current flowed to the finger was not filled with 5% of essential one, it was difficult to detect the correct location. In the embodiment, the AC signal currents flowed to the capacity of the shield plate 4, and the shield electric line 10 are approximately zero. Although a small amount of the AC signal flows to the casing of the touch panel apparatus, the essential AC signal current flown to the finger is about 95% as a whole. Consequently, an AC signal is obtained with a higher degree of reliability than in the conventional apparatus so that stable detection of the contact location is enabled.

It will be understood that each of the above described points of the present application is not limited to a real contact type touch panel apparatus in which a point is indicated on a panel by a finger or a conductive pen for inputting a location (coordinate points). Each of the points also can be effectively utilized for a touch panel apparatus having sections, which are indicated on a similar panel to a touch keyboard by a finger or conductor for inputting selections, and the touch panel apparatus, which detects only contact of a finger or a conductor for providing operation of switch functions.

The input circuit of the signal processing unit as shown in FIG. 2 has a better noise margin than the conventional one. When the input circuit is used with the touch panel apparatus shown in FIG. 1, the contact point touched by the finger or conductive pen is accurately detected such that the apparatus can be sufficiently practically used in an environment such as a general office. Furthermore, in order to assure that the coordinates are accurately detected in a severe noise environment, the touch panel apparatus is improved as described hereinafter. Generally speaking, a sampling is made n times (where n is a positive integer), and averaged, and thereby the S/N ratio is improved by $\sqrt{n}$ times. In the case of the illustrative embodiment, since the coordinates are calculated in accordance with the ratio of each AC signal current flowing to four corners located on the sensor panel 3, the need to average the samplings is eliminated. The coordinates are calculated by sum value in which each output from an analog/digital converter is added n times. The coordinates are calculated in accordance with digitally summed value of current flowing to each point (A, B, C, and D) on the sensor panel 3. As a result, the calculated coordinates get value equal to that of reduction of $1/\sqrt{n}$ in noise affect, while A/D resolution increases.

Figure 3:
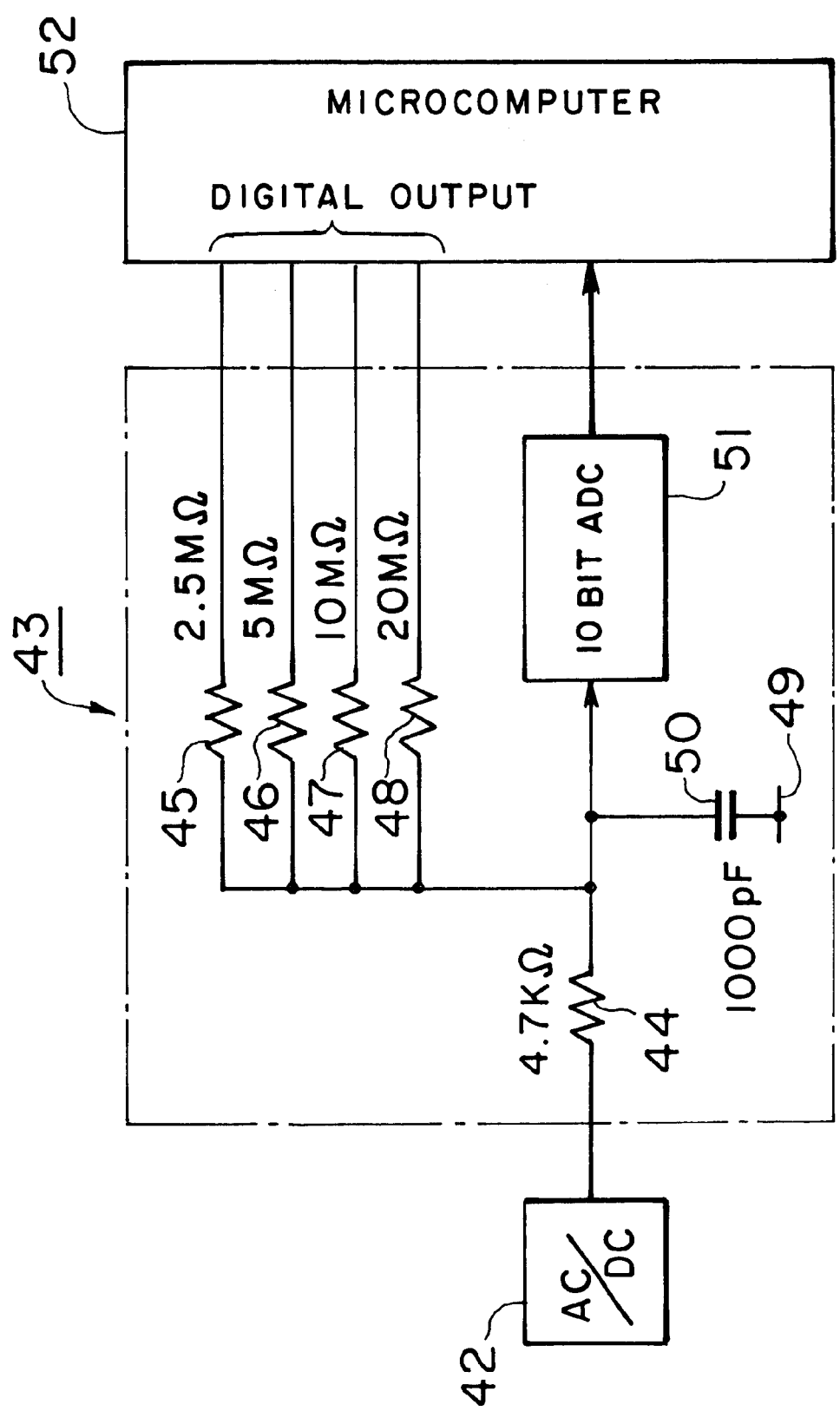
FIG. 3 is a circuit diagram showing a construction according to a high resolution AID for improving S/N ratio.

FIG. 3 is a block diagram showing a concrete structure of an A/D circuit enabling both the increase in S/N ratio and high resolution. The A/D circuit may be disposed in either the signal processing unit 11 of the touch panel apparatus as shown in FIG. 1, or the interface 18. In order to simplify an understanding of this embodiment of the present invention, numeral value such as resistance is indicated. An AC/DC converter 42 (a kind of AM wave detector) has an output impedance with a very small value, which may be regarded as zero. Furthermore, the 10 bit ADC 51 (analog/digital converter) has a very large input impedance value so that the input current may not be observed.

Figure 4:
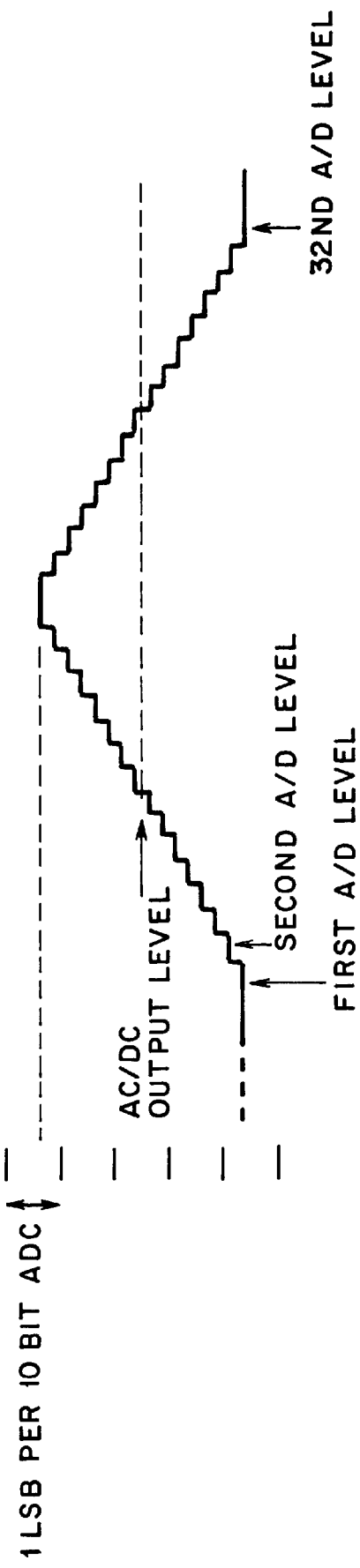
FIG. 4 is a diagrammatic view showing a waveform input to a 10 bit ADC (analog/digital converter).
Figure 5:
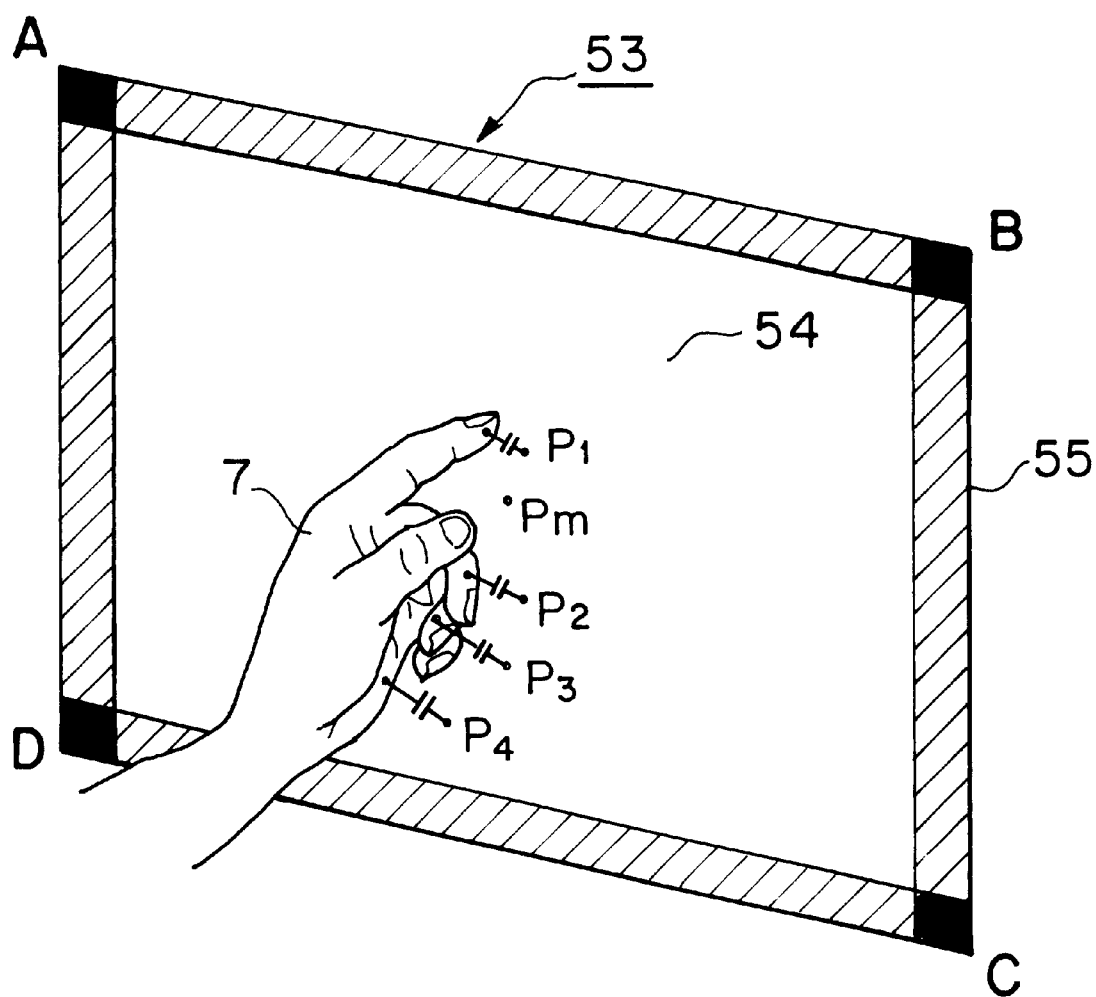
FIG. 5 is a schematic view showing shift of a detected location (palm effect) according to an electrostatic capacity coupling type touch panel.

There is provided a current output type 4 bit D/A comprising resistors 45 to 48, and 4 bit digital output of a microcomputer 52. In order to provide the high resolution, the microcomputer 52 is desired to be of the CMOS type. Therefore, 16 step currents (including positive and negative) are applied to the right end of the resistor 44. As a result, potential difference of 16 steps (amplification of about 20 mV) at the resistor 44 is caused by the applied currents so that the applied current is superimposed on the output voltage of the AC/DC converter 42. The variation in the voltage (input of the 10 bit ADC 51) is shown in FIG. 4. The first 16 steps are formed into an upward slope, and the second 16 steps are formed into a downward slope. The subtle difference in fine characteristics between the upward slope and the downward slope is canceled.

The step-shaped triangular wave has amplitude, which is set to about 4 LSB of 10 bit ADC51. The amplitude can be set to 2 LSB, however, the linearity is slightly attenuated because of that the AD converter does not have reliable final bit in general (FIG. 4 shows each 1 LSB in equal and ideal interval). The step-shaped triangular wave shown in FIG. 4 comprises 32 steps as a whole, each of the steps being A/D converted into 10 bit, and thereby each of the digital outputs is added so that the data of 15 bit is produced as a data per a sample. However, the reliable data may be 13 bit ranked higher in 15 bit. Coordinates are calculated with 15 bit. The final coordinate value is rounded at 0.1 mm. Resolution suffices for the touch panel apparatus used with the conductive pen.

As described above, the A/D circuit used with 10 bit ADC 51 provides resolution of about 13 bit. Considering the sensor panel 3 having A3 size, the required data for resolution of 0.1 mm is 12.1 bit. Therefore, the A/D circuit maybe utilized for the sensor panel 3 having A3 size. Absorption of voltage shock at change of 4 bit digital output from the microcomputer 52 and removal of noise contained in output of the AC/DC converter 42 is partly provided by a capacitor 50.

The A/D circuit provides the high resolution of A/D, and the 15 dB improved effect of S/N ratio as described above. The A/D circuit has a simple construction depicted in a block of numeral reference 43 (by use of the microcomputer 52). The simple construction provides 150 coordinate points detection/sec. at ratio in total.

It should be observed that the S/N ratio and resolution are increased, but the linearity is not changed from 10 bit ADC 51. Therefore, when the sensor panel 3 has same size as A3 size, the resolution obtained therefrom is 0.1 mm at any position. However, the position is often shifted in 0.4 mm from the desired accuracy. The shifted position is in allowable range for the touch panel apparatus in which coordinates are indicated by a finger or a pen. Thus, the high resolution described above is not generally applicable to another applications. However, it is found that the high resolution can be more effectively utilized for the touch panel apparatus for detecting coordinates. Such the touch panel apparatus has a sensor panel having few number of connecting wires for measurement thereon.

Description now will be made in relationship with a structure of the sensor panel 3. The sensor panel 3 has the resistor 5 (film) which is two-dimensionally (any directionally) distributed in uniformity on a transparent glass or an opaque insulated substrate thereof. In the embodiment, tin oxide (SnO2) film is coated on a glass by a spray process. The sensor panel 3 has a surface resistance of 1 k$\Omega$/□ (square). The sensor panel 3 has ambient electrode 6 surrounding the surface resistor 5, and the ambient electrode is made of a material comprising carbon (or silver carbon).

The ambient electrode 6 have a resistance of 120 $\Omega$ between both corners of the sensor panel 3, respectively. The ambient electrode has many types of proposed shapes. In the embodiment, the ambient electrode 6 is formed in a simple four straight linear shape. The combined straight linear shape of the ambient electrode 6 is selected carefully considering each of parameters, and provides the merits described above. The ambient electrodes 6 have connecting terminals disposed at corners thereof for connecting a cable 10 (shield electric wire), respectively. The ambient electrodes 6 may have more number of connecting terminals. Any of points according to the invention has merit.

The reason why the surface resistor 5 comprises tin oxide will be described. Firstly, the conductive film of the sensor panel 3 directly contacted by a finger 7 or a conductive pen requires durability thereof. The tin oxide film is a kind of ceramics, which has similar features to glass. Even if a knife passes usually over the tin oxide film, the tin oxide is not damaged. The tin oxide film has same stiffness as glass, and same or higher strength in scratch as or than glass. The material easily provides 1 k$\Omega$/□ (square) of the surface resistance, which is electrically excellent value, and inexpensive price than other conductive materials. Furthermore, the material has higher lublicity than glass, and provides satisfactory operation for use of conductive pens. Actually, nowadays most of bottles for beverages have a surface coated with the tin oxide film for soft hardening so as to improve lublicity than glass and prevent breakage.

The real contact type touch panel apparatus of the construction described above according to the present invention provides elimination of the palm effect, excellent noise margin, saefety, insulation and high durability irrespective of the sensor panel with simple construction. Furthermore, the touch panel apparatus provides reduced cost of the A/D part, and improvement in S/N ratio and accuracy of detection of touch condition. In addition, the touch panel apparatus provides improved accuracy/reliability, since the touching finger of the man even if floating in air is stably detected unconditionally.

DESCRIPTION OF NUMERAL REFERENCE

1. Voltage-floating system
2. Non-floating system
3. Sensor panel

4. Shield plate
5. Uniform surface resistor
6. Low resistive ambient electrode
7. Finger
8. Equivalent resistance of a human body
9. Ground effect impedance of a human body
10. Shielded electric wire
11. Signal processing unit
12. Isolator
13. A battery or a insulated power source in the non-floating system
14. AC signal generator
15. AC signal coupling capacitor (Insulating capacitor with respect to AC power component)
16. Reference potential circuit in the voltage-floating system
17. Non-floating ground circuit
18. Interface
19. Equivalent coupling voltage source
20. Ground impedance for non-floating system
21. Earth
22. Cramp diode (Substitute load)
23. Band pass coil
24. Band pass capacitor
25. Current/voltage conversion transistor (2SC4116, for example)
26. Resistor (47 Ω, for example)
27. Analog multiplexer
28. Inversive amplification transistor for voltage modulation (2SC4116, for example)
29. Resistor (10 Ω, for example)
30. AC and DC load resistor for transistor 28 and base grounding resistor for transistor 25 (1 kΩ, for example)
31. DC load resistor (4.7 kΩ, for example)
32. Decoupling capacitor (1 $\mu$F, for example)
33. Phase compensating resistor (1 kΩ, for example)
34. Phase compensating capacitor (7 pF, for example)
35. DC voltage dividing resistor (68 kΩ, for example)
36. DC voltage dividing resistor (22 kΩ, for example)
37. AC coupling capacitor (1000 pF, for example)
38. Resistor (1.0 Ω)
39. AC coupling capacitor (0.47 $\mu$F, for example)
40. DC current sink resistor (1.5 kΩ, for example)
41. DC bias resistor for sensor panel (22 kΩ, for example)
42. AC/DC converter (AM detector)
43. High resolution A/D unit
44. Resistor (4.7 kΩ, for example)
45. Resistor (2.5 MΩ, for example)
46. Resistor (5MΩ, for example)
47. Resistor (10MΩ, for example)
48. Resistor (20MΩ, for example)
49. Analog ground
50. Capacitor (1000 pF, for example)
51. 10 bit ADC (analog/digital converter)
52. Microcomputer
53. Electrostatic capacity coupling type panel
54. Uniform surface resistor with a surface coated with an insulating layer
55. Low resistant electrode

What is claimed is:

1. A real contact type touch panel apparatus in which a conductive surface disposed on a sensor panel is directly contacted by a finger or a conductor, the real contact type touch panel apparatus comprising: a voltage-floating system comprising the sensor panel having the conductive surface disposed thereon, a signal processing unit connected to the sensor panel, and a reference potential circuit connected to the signal processing unit; a non-floating system comprising an interface connected to an external apparatus, and a ground circuit; and an isolator for transmitting digital or analog electric information between the signal processing unit and the interface; wherein the reference potential circuit of the voltage-floating system is connected in series to the ground circuit of the non-floating system through an AC signal generator and an AC signal coupling capacitor, the AC signal coupling capacitor having a capacity of 5000 pF or less, the signal processing unit has an input circuit operating as a current/voltage conversion circuit comprising a transistor and a resonance circuit connected to an output of the transistor, the transistor having a base or gate grounded in an AC condition with respect to the current/voltage conversion circuit, an emitter or source into which an AC signal is input, and a collector or drain connected to the resonance circuit, and the resonance circuit comprises a coil and a capacitor.

2. The real contact type touch panel apparatus according to claim 1; wherein the conductive surface comprises a uniform surface resistor, the conductor is a conductive pen, and a detected location on the sensor panel is touched by the conductive pen or the finger.

3. The real contact type touch panel apparatus according to claim 2; wherein the surface resistor comprises tin oxide.

4. The real contact type touch panel apparatus according to claim 2; further comprising A/D conversion means used as signal level measuring means for calculating the contact location, the A/D conversion means comprising means for superposing a step-shaped triangular wave on an output voltage level of an AC/DC converter, the step-shaped triangular wave being generated with an amplitude of 2 or more times the LSB of an analog/digital converter, and means for adding an output at each step of the analog/digital converter.

5. A real contact type touch panel apparatus used with a system to be fed from at least one of a battery, an insulating transformer, or a dedicated generator, in which a conductive surface disposed on a sensor panel is directly contacted by a finger or a conductor, the direct contact type touch panel apparatus comprising: a voltage-floating system comprising the sensor panel having the conductive surface disposed thereon, a signal processing unit connected to the conductive surface, a reference potential circuit connected to the signal processing unit; a non-floating system comprising an interface connected to an external apparatus, and a ground circuit, signal lines for connecting the signal processing unit to the interface for receiving and transmitting therein and therefrom digital or analog electric information; and an AC signal generator provided between the reference potential circuit of the voltage-floating system and the ground circuit of the non-floating system; wherein the signal processing unit has an input circuit operating as a current/voltage conversion circuit comprising a transistor and a resonance circuit, the transistor having a base or gate grounded in an AC condition with respect to the current/voltage conversion circuit, an emitter or source into which an AC signal is input, and a collector or drain connected to the resonance circuit, and the resonance circuit comprises a coil and a capacitor.

6. The real contact type touch panel apparatus according to claim 5; wherein the conductive surface comprises a uniform surface resistor, the conductor is a conductive pen, and a detected location on the sensor panel is touched by the conductive pen or the finger.

7. The real contact type touch panel apparatus according to claim 6; wherein the surface resistor comprises tin oxide.

8. The real contact type touch panel apparatus according to claim 6; further comprising A/D conversion means used as signal level measuring means for calculating the contact location, the A/D conversion means comprising means for superposing a step-shaped triangular wave on an output voltage level of an AC/DC converter, the step-shaped triangular wave being generated with an amplitude of 2 or more times the LSB of an analog/digital converter, and means for adding an output at each step of the analog/digital converter.

9. In a real contact type touch panel apparatus in which a conductive surface on a sensor panel is brought into electrical direct contact with a finger or a conductor connected to the apparatus; means for introducing an AC signal current at frequency of 200 or more kHz to the finger or the conductor through the conductive surface; and means for measuring the AC signal current including one or more current components which are produced by the grounding effect of electromagnetic radiant impedance of an operator's body with the finger or the conductor.

10. A direct contact type touch panel apparatus comprising: a sensor panel having a conductive surface; a signal processing unit connected to the sensor panel; a reference potential generating circuit connected to the signal processing unit; an interface connected to an external apparatus for communicating with the external apparatus; a ground circuit; and an isolator for transmitting digital or analog electric information between the signal processing unit and the interface; wherein the sensor panel, the signal processing unit, and the reference potential generating circuit comprise a voltage-floating system and the interface and the ground circuit comprise a non-floating system isolated from the floating system.

11. A direct contact type touch panel apparatus according to claim 10; wherein the reference potential generating circuit is connected in series to the ground circuit through an AC signal generator and an AC signal coupling capacitor, the AC signal coupling capacitor having a capacity of 5000 pF or less.

12. A direct contact type touch panel apparatus according to claim 10; wherein the signal processing unit has an input circuit operating as a current/voltage conversion circuit comprising a transistor and a resonance circuit comprising a coil and a capacitor connected in parallel, the transistor having a base or gate grounded in an AC condition, an emitter or source into which an AC signal is input, and a collector or drain connected to the resonance circuit.

13. A direct contact type touch panel apparatus according to claim 10; wherein the signal processing unit is connected to the reference potential generating circuit.

14. A direct contact type touch panel apparatus according to claim 10; wherein the conductive surface comprises a surface resistor, the conductor is a conductive pen, and a detected location on the sensor panel is touched by the conductive pen or an operator's finger.

15. A direct contact type touch panel apparatus according to claim 10; wherein the surface resistor comprises tin oxide.

16. A direct contact type touch panel apparatus according to claim 10; further comprising means for flowing an AC signal current having a frequency of 200 kHz or more into the finger or conductor through the conductive surface.

17. A direct contact type touch panel apparatus according to claim 10; further comprising A/D conversion means used as signal level measuring means for calculating the contact location of the finger or conductor, the A/D conversion means comprising an AC/DC converter, an analog/digital converter, and means for superposing a step-shaped triangular wave on an output voltage of the AC/DC converter, the step-shaped triangular wave being generated with amplitude of 2 or more times the LSB of the analog/digital converter.

* * * * *